Dec. 7, 1965  YAO T. LI ETAL  3,221,557
PRESSURE TRANSDUCER
Filed June 13, 1962

INVENTORS
YAO T. LI  SHIH Y. LEE
BY
Ezekiel Wolf, Wolf & Greenfield
ATTORNEYS 3,221,557
PRESSURE TRANSDUCER
Yao T. Li and Shih Ying Lee, South Lincoln, Mass.
(both % Dynisco, 42 Carleton St., Cambridge, Mass.)
Filed June 13, 1962, Ser. No. 202,265
8 Claims. (Cl. 73—406)

This invention relates to pressure gages having diaphragm-type pressure sensing elements. It is one important object of this invention to provide an improved gage having a more nearly constant sensitivity than those heretofore available.

Manufacturers of pressure gages of the type disclosed in my earlier Patent No. 2,627,749, dated February 10, 1953, have continuously sought means of improving the linearity of these instruments. In gages having diaphragm-type pressure sensing elements, the effective area of the diaphragms change as the diaphragms displace in response to applied pressures. Various techniques have been adapted to overcome this problem but none have been wholly satisfactory. For example, in accordance with one technique the dished portion of the diaphragm has been formed with a special cross-sectional shape which, as disclosed in my copending application Serial No. 851,357, filed November 6, 1959, now Patent No. 2,991,859, to a substantial extent eliminates changes in the effective area. While this technique is in part successful, other problems have arisen resulting from the particular cross-sectional shape prescribed. For example, it is difficult to draw diaphragms into the cross-sectional shape prescribed, and once formed diaphragms of that shape are substantially less flexible than desired.

Non-uniform sensitivity in gages may be caused by several other reasons in addition to changing effective areas of sensing diaphragms. For example, the stiffness of a flat diaphragm increases as it dishes under pressure. Therefore, without means for compensating for the increased stiffness, the sensitivity of the gage which includes the diaphragm will decrease with increased loads over its operative range. Another example of non-linear gage sensitivity is found in semiconductor strain gages. These instruments have a sensitivity which decreases with input.

It is therefore another important object of this invention to provide an elastic restraining means suitable for use in a wide variety of pressure gages, which may compensate for changes that occur in other parts of the gages and which otherwise would render them non-linear.

Another important object of this invention is to improve the linearity of gages without sacrificing diaphragm flexibility or making more difficult the task of forming the diaphragms.

Still another important object of this invention is to provide in a diaphragm-type pressure gage, an elastic restraining member which has non-linear characteristics of the diaphragm so as to achieve linearity between signal output of the gage and pressure input.

To accomplish these and other objects the pressure gage of this invention includes a diaphragm having an effective area which decreases with deflection, and an elastic restraining element secured to the diaphragm and having a stiffness which also decreases with deflection so as to achieve a substantially linear relationship between deflection and applied pressure.

These and other objects and features of this invention will be better understood and appreciated from the following detailed description of one embodiment thereof, selected for purposes of illustration and shown in the accompanying drawing, in which.

Figure 1:
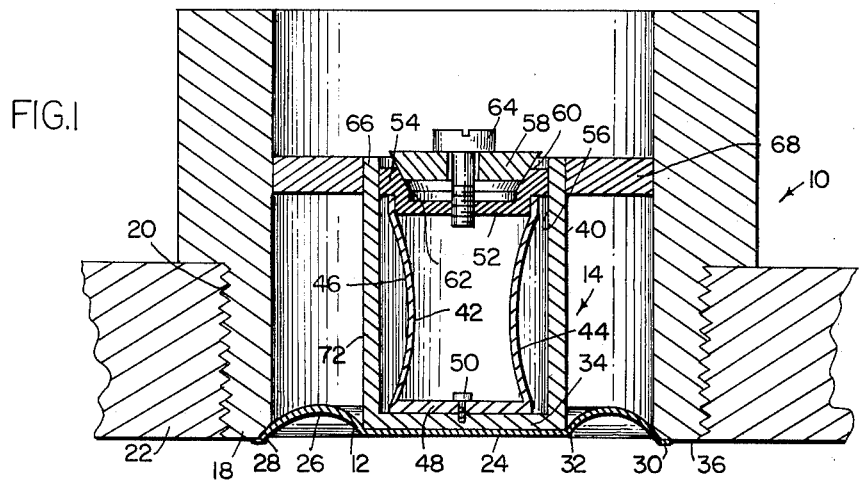
FIG. 1 is a cross sectional view of a pressure gage constructed in accordance with this invention.

The embodiment of this invention shown in the drawing includes a frame 10 supporting a sensing device in the form of a diaphragm 12 at one end, an elastic restraining assembly 14, and a signal generator 16 secured to the elastic restraining assembly 14.

The frame 10 includes a lower cylindrical portion 18 which may be externally threaded as suggested at 20 so that it may be anchored in a wall 22 of a chamber containing the fluid whose pressure is to be measured. The diaphragm 12 extends across the lower end of the cylindrical portion 18 of the frame and includes a flat circular central portion 24 and a surrounding dished annular portion 26. The peripheral edge 28 of the diaphragm may be secured to the lower end 30 of the cylindrical portion 20 by silver soldering, welding, or any other suitable means. Similarly, the inner edge 32 of the annular portion 26 of the diaphragm may be secured to the lower end of the elastic restraining assembly 14.

The elastic restraining assembly 14 includes a primary elastic element 40 in the form of a cylinder closed by end wall 34, and a secondary elastic restraining element 42 having a pair of slender columns 44 and 46 joined by a cross member 48 seated on the end wall 34 and secured in place by screw 50. The slender columns 44 and 46 extend upwardly from the cross member 48 and are joined to a dish-shaped disc 52 having a skirt 54 which bears against the inner surface 56 of the primary elastic element 40. The skirt 54 is spread by a frusto-conical shaped disc 58 whose tapered wall 60 mates with a similarly tapered wall 62 forming part of the dish-shaped disc 52. By tightening the screw 64 the frusto-conical shaped disc 58 is forced into the dish-shaped disc 52 and spreads or expands the skirt 54 so that it bears tightly against the inner wall 56 of the cylinder 40. Thus, any desired load may be applied to the slender columns 44 and 46 of the secondary elastic restraining element 42 and the load may be stabilized under static conditions by tightening the disc 52 so that it will not move relative to the cylinder 40. The upper end 66 of the cylinder 40 is secured to the frame 10 by the annular plate 68.

Pressure applied to the diaphragm 12 will distort the elastic elements 40 and 42, and if the gage has a constant sensitivity the distortion of the elements will have a linear relationship with the applied pressure. To measure the distortion of the primary and secondary elastic restraining elements, a bonded strain gage 70 is secured to the outer surface 72 of the primary element or cylinder 40. The gage includes a number of longitudinal strain windings 74 and a number of circumferential or strain windings 76 wound about the cylinder 40. While the windings 74 respond to the compressive stress on the tube or cylinder caused by the pressure loading, the windings 76 respond to the tensile stress which is proportional to the product of the compressive stress and Poisson's ratio. The windings 74 and 76 are connected in a bridge circuit 78 so that the bridge output represents the sum of the longitudinal and lateral strain. The bridge circuit is completed by a balancing bridge resistor 80 and a power source 82. The output signal is measured across terminals L1 and L2, terminal L1 being connected to the center tap of the balancing bridge resistor 80 while terminal L2 is connected to the junction between the longitudinal and circumferential windings 74 and 76.

Figure 4:
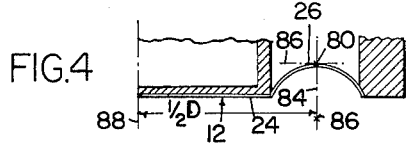
FIGS. 4 and 5 are fragmentary cross-sectional views of the diaphragm of the gage, illustrating the changes in the effective area of the diaphragm with displacement.
Figure 5:
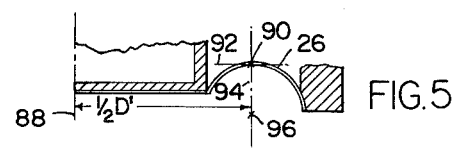
Figure 2:
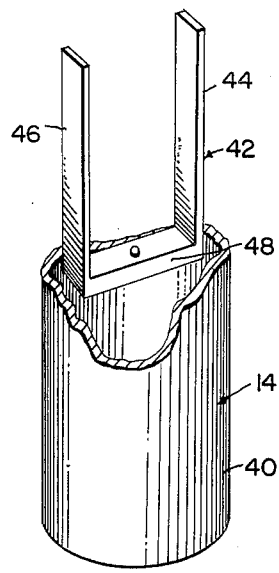
FIG. 2 is a fragmentary perspective view of the elastic restraining means shown in FIG. 1, with the parts disassembled.
Figure 3:
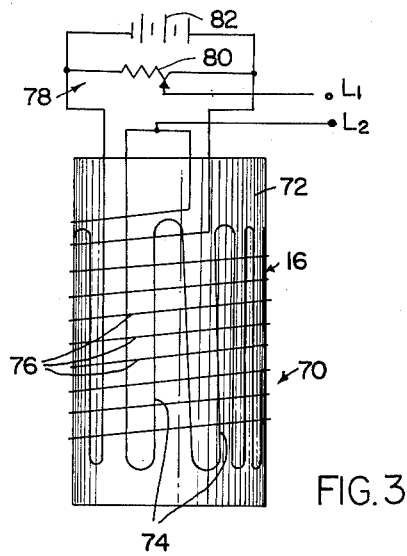
FIG. 3 is a diagrammatic view of the signaling device of the gage shown in FIG. 1, with the circuit shown schematically.

Having described in general terms the various parts of the gage, the manner in which they function in response to an applied pressure sensed by the gage and cooperate with one another to provide a gage having a substantially constant sensitivity will now be described. In FIGS. 4 and 5 the results of displacement upon diaphragm effective area is shown. It should be borne in mind that the displacement of the diaphragm is equal to the product of the net force applied to the diaphragm and the reciprocal of the modulus of elasticity of the diaphragm and the elements which restrain its movement. Thus, the displacement of the sensing device is proportional to the applied force. As the force exerted on the diaphragm is equal to the product of the applied pressure and the diaphragm's effective area, a linear relationship between displacement and pressure exists only if the effective area of the diaphragm remains constant.

The diaphragm 12 as described above has a flat central portion 24 and a shallow dished annular portion 26, and they are positioned as shown in FIG. 4 under ambient conditions. In this position, the deepest point 80 of the diaphragm is located by the tangent 86 which of course is normal to the vertical 84 passing through the center of curvature 86 of the dished portion 26 of the diaphragm. Thus, the vertical line 84 and the center line 88 of the diaphragm define the limits of the radius (½D) of the effective area of the diaphragm in its reference position. When the diaphragm displaces upwardly to the position shown in FIG. 5 under an applied pressure, the deepest point of the diaphragm occurs at 90, which point may be located by the tangent 92 or the vertical 94 intersecting the displaced center of curvature 96 of the arc of the annular portion 26 of the diaphragm. Thus, the line 94 which defines the limit of the radius (½D') of the diaphragm has moved in the direction of the center line 88, and the effective area of the diaphragm in FIG. 5 is appreciably smaller than that in FIG. 4. Therefore, any given pressure applied to the diaphragm will assert a greater force upon it when the diaphragm is in the position shown in FIG. 4 than when it is in the position shown in FIG. 5. It will be recognized that the effective area of the diaphragm will steadily decrease as it displaces upwardly from its reference position under the influence of increased pressures.

The stiffness of the primary elastic element, expressed mathematically by the expression $$\frac{df_1}{dx}$$

is constant within the operative range of the gage. The area of the diaphragm expressed by the function $$\frac{df}{dp}$$

reduces with deflection over the operative range. By adding a slender secondary elastic restraining element in the form of the columns 44 and 46 having a stiffness $$\frac{df_2}{dx}$$

which decreases with deflection, then the combined stiffness of the primary and secondary elastic restraining elements expressed as $$\frac{d(f_1+f_2)}{dx}$$

decreases with displacement, and the reciprocal expression $$\frac{dx}{d(f_1+f_2)}$$

increases with deflection. By matching the factors $$\frac{df}{dp}$$

and $$\frac{dx}{d(f_1+f_2)}$$

so that their product is constant, the sensitivity of the gage is constant. Thus the ideal condition may be expressed mathematically as follows:

$$\frac{dx}{dp}=\frac{df}{dp}\times\frac{dx}{d(f_1+f_2)}=\text{constant}$$

In the foregoing description the adjustable collar 52 which varies the bend in the slender columns 44 and 46 when the gage is in its reference condition was suggested to be a means for tuning the gage. When the columns 44 and 46 are straight, their stiffness $$\frac{df_2}{dx}$$

is substantially constant. However, when they are bent by being subjected to a load which is greater than the critical load, the stiffness of the columns markedly decreases with additional loads applied to them. Therefore, the stiffness of the columns may be altered to suit the particular configuration of the diaphragm employed. That is, if the diaphragm experiences an extremely small change in effective area through the operative range of the instrument the load applied to the columns 44 and 46 by means of the adjustment of the collar 52 will be small so that its stiffness remains substantially constant throughout the operative range. Alternatively, if the diaphragm through the operative range of the gage experiences a relatively great change in effective area the loads applied to the columns 44 and 46 may approach or exceed their critical loads so that any further load applied to them under the influence of pressure upon the diaphragms causes them to experience a marked reduction in stiffness. In this manner the combined stiffness of the columns 44 and 46 with the primary elastic restraining member 40 may be matched to the changing area of the diaphragm.

In use the gage is employed in the conventional manner. The lower portion 18 of the frame 10 may be screwed into an opening provided in the wall of the chamber whose internal pressure is to be measured. The deflection of the diaphragm 12 under the influence of the pressure in the chamber is reflected in a compression of the cylindrical primary elastic restraining member 40, and its change in shape is sensed by the bonded windings 74 and 76 of the strain gage 70. By means of the bridge circuit 78 a signal is produced which is proportional to the distortion of the cylinder 40. If the instrument has been tuned by matching the stiffness of the columns 44 and 46 with the changes in effective area experienced by the diaphragm in the operative range the signal produced by the bridge circuit will be proportional to the pressure applied to the diaphragms. Thus the instrument will possess the desired constant sensitivity.

While we have described in detail the advantages of the elastic restraining means when used in connection with a gage having a sensing diaphragm that decreases in effective area with load, it will be appreciated that the very same characteristics that render the elastic restraining means suitable in that application also render it suitable for use in other applications such as those alluded to in the introduction. For example, in the case of an instrument having a diaphragm with a stiffness which increases with load, constant sensitivity may be achieved by incorporating the elastic restraining means into the gage. As the stiffness of the diaphragm increases the stiffness of the elastic restraining means decreases, and by matching these parameters, a linear instrument may be obtained.

From the foregoing description those skilled in the art will appreciate that numerous modifications may be made of this invention without departing from its spirit. For example, the primary elastic restraining element need not be a tube or cylinder as illustrated but may have any other configuration. Similarly, the slender columns 44 and 46 may be replaced by a single column of different shape. Because such modifications suggest themselves, it is not our intention to limit the breadth of this invention to the single embodiment illustrated and described. Rather, it is our intention that the breadth of this invention be determined by the appended claims and their equivalents.

What is claimed is:

1. A pressure sensing device comprising
 a diaphragm having an effective area which decreases with deflection over the operative range of the device,
 a support for the diaphragm enabling the diaphragm to be exposed to a variable pressure,
 and an elastic restraining element secured to the diaphragm for resisting diaphragm deflection and having a stiffness which decreases with deflection over the operative range, the rate of change of area of the diaphragm and the stiffness of the restraining element being tuned to one another.

2. A pressure sensing device comprising
 a frame,
 a diaphragm extending across the frame and adapted to be exposed to a fluid whose pressure is to be measured, said diaphragm having a response characteristic that varies with deflection of the diaphragm from its neutral position over the operative range of the gage,
 a primary column secured to the frame and engaging the diaphragm and having a constant stiffness within the operative range of the gage,
 and a secondary column secured to the frame and the diaphragm and having a stiffness which varies with deflection over the operative range, the ratio of change of the response characteristic of the diaphragm and the stiffness of the secondary column with deflection of the diaphragm being tuned to one another so that the distortion of the primary column is proportional to the pressure to which the diaphragm is exposed.

3. A pressure sensing device as defined in claim 2 further characterized by
 adjusting means secured to the secondary column for changing the effects of displacement upon the stiffness of the secondary column over the operative range.

4. A pressure sensing device comprising
 a cylindrical frame,
 a cylindrical column disposed coaxially in the frame with one end of the cylinder lying substantially in the plane of one end of the frame,
 a diaphragm secured to the one end of the frame and with its central portion secured to the adjacent end of the column,
 said diaphragm thereby having a flat central portion and a surrounding dished annular portion with the column establishing a neutral position for the diaphragm,
 said diaphragm having an effective area which decreases and a stiffness which increases with displacement of the diaphragm from its neutral position,
 and a slender column disposed inside the cylindrical column and relatively flexible with respect to the cylindrical column,
 said columns serving as elastic restraining members resisting displacement of the diaphragm when pressure is applied thereto and having a combined stiffness which is tuned to the stiffness and effective area of the diaphragm.

5. A pressure sensing device as defined in claim 4 further characterized by
 a combined stiffnes of the cylindrical and slender columns decreasing with deflection of the diaphragm.

6. A pressure sensing device as defined in claim 1 further characterized by
 means secured to the elastic restraining element for adjusting the tuning of the stiffness to the effective area of the diaphragm.

7. A pressure sensing device as defined in claim 1 further characterized by
 the product of the expressions representing one and the reciprocal of the other of the effective area of the diaphragm and the stiffness of the elastic restraining element being substantially constant.

8. A pressure sensing device comprising,
 a cylindrical frame,
 a diaphragm secured to and closing one end of the frame,
 a strain tube disposed coaxially in the frame and having a closed flat end that bears against and is secured to the central portion of the diaphragm to establish on the diaphragm a flat central portion and an inwardly dished surrounding annular portion,
 said strain tube acting in compression to resist inward deflection of the diaphragm in response to pressure exerted against its outer face and establishing a neutral position for the diaphragm,
 said diaphragm having a sensitivity to pressure exerted against its outer face that decreases with inward deflection of the diaphragm,
 and a slender column disposed within the frame and secured to the diaphragm complementing the restraint against displacement exerted by the strain tube upon the diaphragm,
 said slender column having a stiffness which decreases with inward deflection of the diaphragm and which stiffness is tuned to the decreasing sensitivity of the diaphragm.

References Cited by the Examiner

UNITED STATES PATENTS

| | | | |
|---|---|---|---|
| 2,940,313 | 6/1960 | Li | 73—398 X |
| 2,953,024 | 9/1960 | Walz | 73—384 |
| 2,981,912 | 4/1961 | Giovanni | 73—398 |

RICHARD C. QUEISSER, *Primary Examiner.*

ROBERT EVANS, *Examiner.*